United States Patent [19]

Biverot

[11] Patent Number: 4,868,378

[45] Date of Patent: Sep. 19, 1989

[54] DEVICE FOR LOCATING THE SOURCE OF COHERENT LIGHT THROUGH A TURBULENT MEDIUM

[75] Inventor: Hans G. Biverot, Vällingby, Sweden

[73] Assignee: U.S. Philips Corporation, New York, N.Y.

[21] Appl. No.: 197,078

[22] Filed: May 20, 1988

[30] Foreign Application Priority Data

May 27, 1987 [SE] Sweden .............................. 8702245

[51] Int. Cl.$^4$ .............................................. G01J 1/20
[52] U.S. Cl. ................................ 250/203 R; 356/141
[58] Field of Search ............... 250/203 R, 203 S, 227; 126/424, 425; 356/141, 152; 350/96.10

[56] References Cited

U.S. PATENT DOCUMENTS

| | | | |
|---|---|---|---|
| 3,699,345 | 10/1972 | Parkin | 250/203 R |
| 3,700,905 | 10/1972 | Parkin et al. | 250/203 R |
| 3,875,402 | 4/1975 | Parkin | 250/203 R |
| 4,477,145 | 10/1984 | Mori | 350/96.10 |
| 4,491,727 | 1/1985 | Appelbaum et al. | 250/203 S |

Primary Examiner—David C. Nelms
Assistant Examiner—William L. Oen

[57] ABSTRACT

Devices includes light receiving elements which are divided into a number of groups in which each group has a common sensitivity direction. Within such a group the elements are spatially separated from each other at a distance of at least the order of magnitude of the decorrelation length of the light in question. The originally coherent light can be detected and the direction can be determined even during real operating conditions from the information given to the light receiving elements by detecting light of a statistically more favourable distribution.

8 Claims, 2 Drawing Sheets

DEVICE FOR LOCATING THE SOURCE OF COHERENT LIGHT THROUGH A TURBULENT MEDIUM

BACKGROUND OF THE INVENTION

The invention relates to a light detecting and direction determining device comprising several groups of light receiving elements.

The term light is herein understood to mean ultraviolet and infrared radiation as well as visible light. The radiation is originally coherent, that is the wave front from the light source has a high degree of correlation in time and space, which is the case for laser light.

Such a light detecting and direction determining device is described in GB-A-No. 2 112 244. The light receiving elements are here formed by one of the end surfaces of optical fibres (light guides). Each end surface of a fibre, which serves as a receiving element, normally covers a separate angular space while each fibre has a different length which is used to identify the angular space in question. During real operation conditions affected by air turbulence and so called "speckles" associated herewith, a device of the type described above has an insufficient performance, especially in the case of separate laser pulses.

SUMMARY OF THE INVENTION

A device according to the invention detects the wave front of the incident light in such a way that a statistically more favourable distribution is obtained and thereby increases the chances of discovering the light and determining its direction. The statistically more favourable distribution situation will be explained in more detail below. To achieve the light receiving elements are divided logically into at least two groups, the light receiving elements within one and the same group having an essentially coincident direction of sensitivity and being spatially separated from each other at a distance of at least the order of magnitude of the decorrelation distance of the light in question, the light incident on the light receiving elements within a group is combined, and the light incident on the receiving elements of different groups is compared for determining the direction of the wave front of the incident light.

The correlation of the light disturbed by the influence of the atmosphere, i.e. air turbulence, which causes irregularities to arise in the wave field is complicated and has been described inter alia by V. I. Tatarski, "Wave propagation in Turbulent Medium" (McGraw-Hill, New York, 1961) and by J. W. Goodman, "Statistical Optics" (John Wiley 1985). The amplitude statistics of the wave field at a point may be described by means of logarithm-normal distributions. When the turbulence of the air has high values, which is commonly expressed by means of the variance of the logarithm for the irradiance of the wave field, var(ln H), a saturation condition occurs having a one-sigma distribution of ln(H) close to 2. The irradiated area is divided into smaller (connected) parts, so called W "speckles" having geometrical dimensions of the order of magnitude of a Fresnel radius, that is $(XR)^{\frac{1}{2}}$, in which X is the wave length and R is the distance between the light source and the light receiving element. Within each area having such dimensions (an elementary area in the phase spaced having an extension in time which depends on coherence and an extension in size which depends on the so-called spatial coherence), there is a high correlation between the parts of the field, while the correlation is low at greater distances.

The statistical distribution of the light wave field in one point, when having passed through a turbulent atmosphere, shows a very pronounced skewness having a high concentration of the frequent function towards the origin. This means that the signal-to-noise ratios required for a high detection probability of separate laser pulses within surfaces having an extension less than the Fresnel radius are very high. The known device as described above therefore requires a very large signal-to-noise ratio to be able to detect separate laser pulses with great probability.

If instead, as is the case according to the invention, the light detecting and direction determining device comprises light receiving elements which sample the wave field from a number of receiving surfaces having a mutual distance apart of the order of magnitude of at least the Fresnel radius i.e. the decorrelation distance, the skewed concentration of the frequency function towards the origin is avoided. In fact, when the one-sigma dispersion of ln(H) is near the value of 2, the frequency function, in the case where several "speckles" are combined, shows a much more favourable appearance as regards the signal-to-noise ratio having a weak top level around the means value of the frequency function.

DETAILED DESCRIPTION OF THE PREFERRED EMBODIMENT

Figure 1:
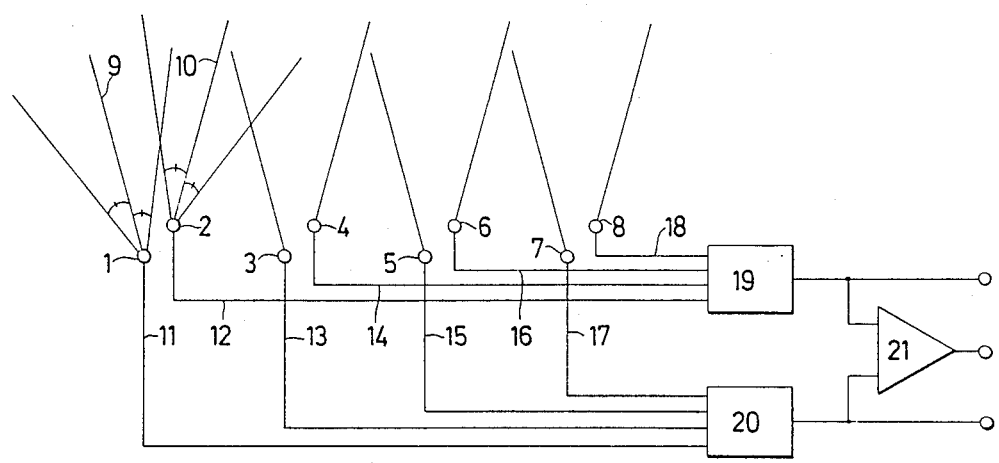
FIG. 1 shows a schematic embodiment of a light detecting and light direction determining device.

The schematic embodiment shown in FIG. 1 of a light detecting and light direction determining device according to the invention comprises two groups, each having four light receiving elements 1, 3, 5, 7 and 2, 4, 6, 8, respectively. One of the groups 1, 3, 5, 7 has a common coincident sensitivity direction 9 and the other group 2, 4, 6, 8, has another coincident sensitivity direction 10. The light receiving elements are sensitive to light in cone-shaped space around the defined sensitivity directions. Each light receiving element 1–8 is constituted by one of the end surfaces of a light conductor or a bundle of light conductors 11–18. The other end surfaces of the light guides or bundles 11, 13, 15, 17 are coupled to a first detector 19 and the other end surfaces of the light guides 12, 13, 16, 18 are connected to a second detector 20. The two detectors 19, 20 may be identical, each performing an additive combination of light intensities on the incoming corresponding light guides to generate an output signal on the respective detector circuit. It is possible to detect emitted laser pulses, if any, in the output signal with great probability. In order to determine the direction of the incident light for a laser light source, the output signal from the two detectors are compared in a comparator. A measure of the incident direction of the light is obtained, for example by comparing the amplitudes for the output signals of the two detectors in comparator 21.

Figure 2:
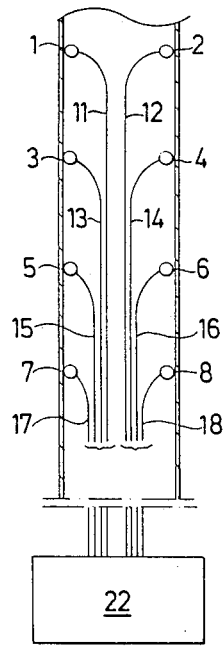
FIG. 2 shows an example of a way of arranging the light guides in a physically delimited structure.

FIG. 2 shows a simple and practical arrangement of a number of light guides in a physically delimited structure. The delimited structure has a cylindrical shape. In the inner part of the cylindrical structure a number of light guides 11–18 are introduced along the longitudinal direction of the structure. One of the end surfaces of each light guide is disposed adjacent to the structure envelope while the other end surface is disposed near a detector plane outside the structure in its longitudinal direction. Light receiving elements, that is light guide end surfaces which are arranged in a row along the longitudinal direction of the structure are included in the same group and have the same sensitivity direction. Light incident on light receiving elements belonging to the same group is combined in a common detector 19 or 20. For the sake of clearness only two groups of light receiving elements have been shown in the present embodiment. However, the proposed structure admits a great number of light receiving elements which inter alia may improve the accuracy in determining the light directions for incident laser light.

Figure 3:
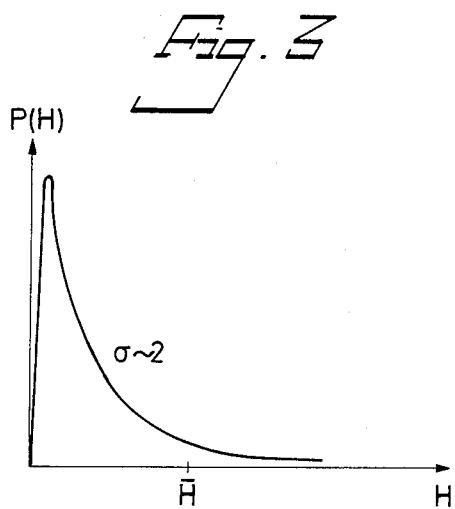
FIG. 3 shows frequency functions of the statistical fluctuations of the wavefield when detecting in a point for $\sigma = 2$ and FIG. 4 shows the frequency function for the statistical fluctuations of the wave field when combining several "speckles".

FIG. 3 shows the frequency function for the statistical fluctuations of the wave field of light when detected in one single point. The frequency function is shown for $\sigma=2$, which is a value well in accordance with reality when the light is subjected to strong turbulence. As is apparent from said frequency function, it presents a high concentration towards the origin. Around the mean value for the irradiance ($\bar{H}$) the frequency function presents a low value and there is a great risk that the light from a laser source in the shape of, for example, a separate laser pulse may remain undiscovered in the background light.

Figure 4:
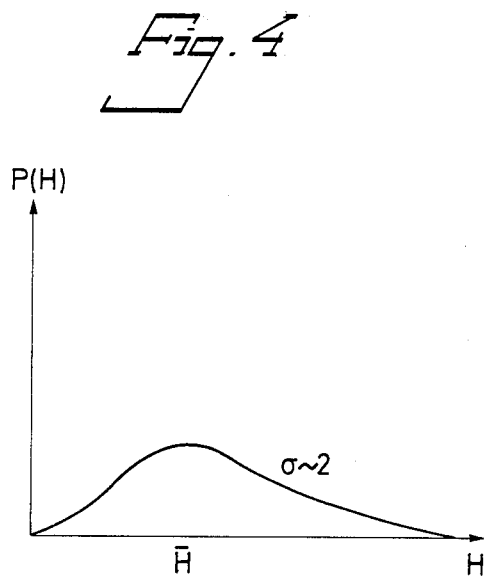

The frequency function shown in FIG. 4 for the statistical fluctuations of the wave field relates to the situation when light from several "speckles" is detected. Also in this case the situation is shown for $\sigma=2$ which is in good accordance with reality. The frequency function in this case shows a top value in the vicinity of the mean value of the irradiance ($\bar{H}$). On both sides of this top value the frequency function is slowly decreasing. Thereby the received light gets a more favourable distribution and the risk of a laser pulse, if any, disappearing in the background light is considerably less than in the case when detecting in one single point.

The light detecting and light direction determining device described above is particularly suitable as a laser warner serving to warn an object being subjected to laser light so that it is possible to employ counter measures. Another interesting field of application is optical communication. In this case the signal-to-noise ratio may be kept high by means of the sampling operation while the equipment may be designed to have small dimensions. Accordingly, an optical antenna may suppliment conventional radio antennas even on mobile equipment, including portable equipment. In this case all advantages, including the selectivity, the high resistance to lapping, etc. which are significant for communication in the optical field may be used. Simultaneously the receiver has the possibility to transmit back selectively in the correct direction which direction is detected simultaneously with the received signal.

In the above embodiment according to FIG. 1, for each sensitivity direction the light intensity is summed on a light detector. It is also possible to utilize the fact that light passing through a light guide contains information about the angle of incidence in the light guide for light because the angle between the direction of incidence of the laser light and the axis of the light guide is maintained to some extent. However, the aximuth direction is lost causing the occurrence of a ring of light on the output side of the light guide. The diameter of the ring in combination with interpolation of the total intensity between different groups presents information about the angle of incidence of the laser light. Information of the angle of incidence of the light may also be obtained by using the coherence of the laser light. The direction of propagation of the wave front may be detected by means of the appearance of the presented pattern when the receiver is arranged in the shape of a phase collerator, that is an optical interferometer. A laser warner which uses a so called "etalon" for this purpose has been previously proposed in U.S. Pat. No. 4,309,108 and is designed in conventional optics and detects in one point only.

In connection with this it is also to be noted that a check of the degree of coherence of the received light by measuring the visibility of interference fringes from the receiver optics is a valuable discrimination possibility against false alarm by incoherent light source.

What is claimed is:

1. A light detecting and light direction determining device comprising a plurality of light receiving elements, the light receiving elements being divided into at least two groups, the light receiving elements within one and the same group having an essentially coincident sensitivity direction and being spatially separated from each other at a distance of at least the order of magnitude of the decorrelation distance of incident light, combining means for combining the light incident on the light receiving elements within a group so that the relative light incident on the receiving elements of different groups is representative of the direction of the wave front of the incident light.

2. A device as claimed in claim 1, where the light receiving elements are formed by end surfaces of light guides or guiding the received light to light combining means for the respective groups.

3. A device as claimed in claim 2, wherein said light guides are supported in a physically delimited structure, one end surface of each light guide is disposed on the envelope of the structure to operate as a light receiving element and the other end surface is disposed outside the structure adjacent to said light combining means.

4. A device as in claim 1, wherein light incident on the light receiving elements within a group is combined by adding the intensities received from each individual light guide.

5. A device as claimed in claim 4, wherein the combined light for a group of light elements is compared with another group of light elements for determining the direction of the wavefront of the incident light.

6. A coherent light detection device comprising:
   a first plurality of light detectors arranged in a first row, each having a common light receive axis and spaced apart from each other a decorrelation distance of incident light;
   a second plurality of light detectors arranged in a second row, each having a common receive axis different from said first plurality of light detectors common receive axis, and spaced apart decorrelation distance of incident light;

a first common detector connected to receive light output signals from said first plurality of light detectors;

a second common detector connected to receive light output signals from said second plurality of light detectors; and, a comparator connected to measure the relative light intensity received on said first and second common detectors to determine the direction of a source of coherent light which irradiates said first and second plurality of light detectors.

7. The coherent light detector of claim 6 wherein said first and second rows of light detectors are disposed against an inside wall of a cylindrical structure, parallel to the cylindrical axis of said cylindrical structure.

8. The coherent light detector of claim 6 wherein said decorrelation distance is at least the Fresnel radius of incident light.

* * * * *